Patented Feb. 2, 1926.

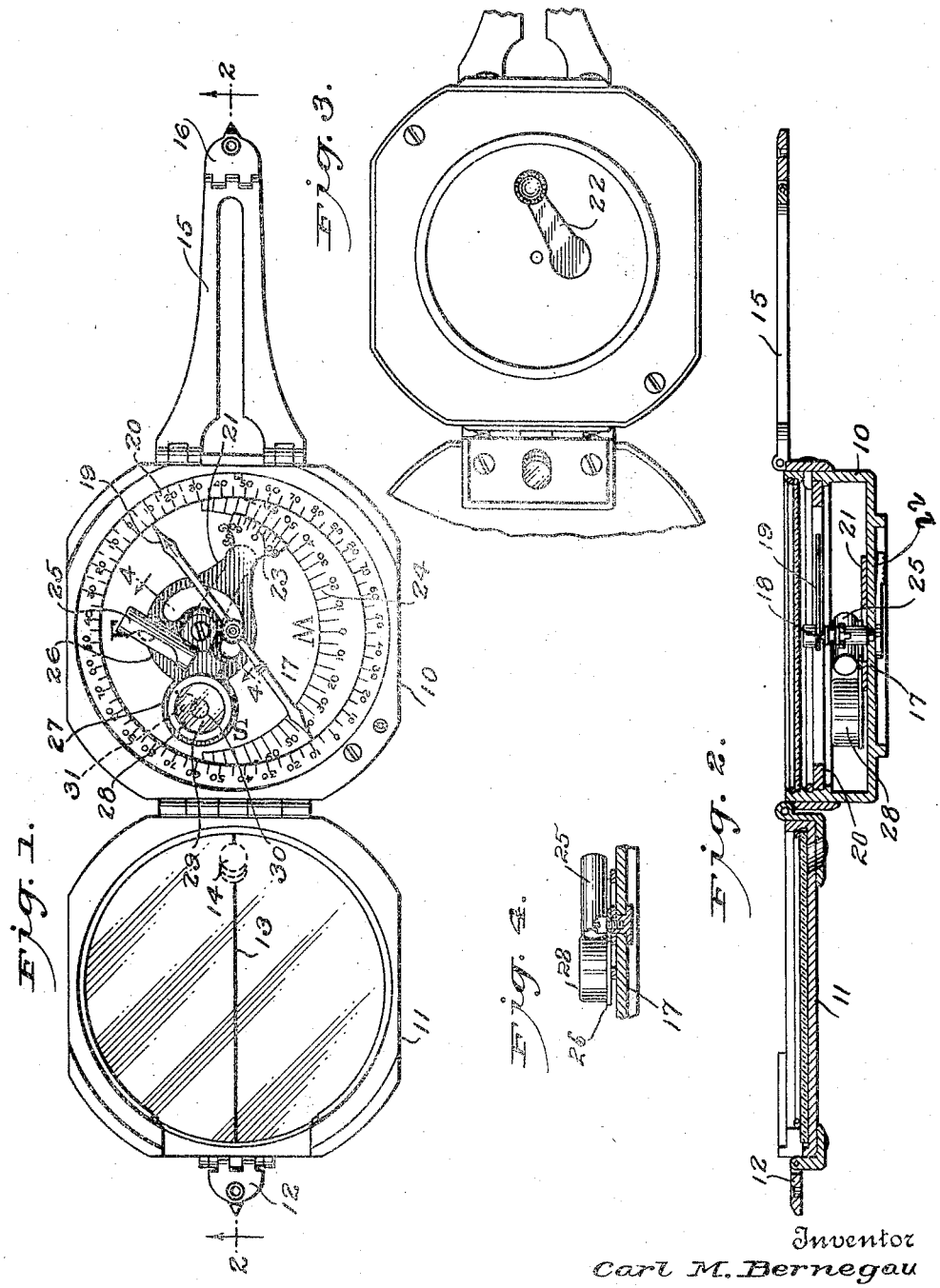

1,571,697

UNITED STATES PATENT OFFICE.

CARL M. BERNEGAU, OF HOBOKEN, NEW JERSEY, ASSIGNOR TO KEUFFEL AND ESSER COMPANY, OF HOBOKEN, NEW JERSEY, A CORPORATION OF NEW JERSEY.

TRANSIT.

Application filed April 7, 1923. Serial No. 630,504.

*To all whom it may concern:*

Be it known that I, CARL M. BERNEGAU, a citizen of the United States, and a resident of Hoboken, in the county of Hudson and State of New Jersey, have made and invented certain new and useful Improvements in Transits, of which the following is a specification.

My invention relates to pocket transits and has for its object to increase the precision and accuracy of readings and measurements which may be made with this type of instrument.

In order that exact and precise readings or measurements may be made, it is necessary that the instrument be accurately level and at the same time it is essential that the bottom wall of the transit be unencumbered by vials or bubble tubes so that the clinometer scale may be inscribed thereon and the clinometer arm may move freely across this scale. It is also of importance that the entire instrument be of restricted or limited dimensions and the exterior of the casing be unencumbered, so that the transit may be readily carried within the pocket or occupy but little space in a traveling case.

It is accordingly an object of my invention to provide an instrument of the class described having the usual type of bubble tube mounted upon the clinometer arm and with the curvature of the tube lying in a plane exactly parallel to the plane of movement or turning of the clinometer arm, so that accurate and precise readings may be obtained, and to further provide upon the clinometer arm a spherical or dome-shaped leveling vial having a centralized reference marking, so that the precise and accurate leveling of the instrument may be made and without calling upon the clinometer level to aid in this leveling operation.

A further object is to accomplish the aforementioned ends in a simple, practical and expeditious manner, and to enhance generally and increase the utility of instruments to which the present type belongs, and with the foregoing and other objects in view, my invention consists in the improved pocket transit illustrated in the accompanying drawing and hereinafter described and claimed, and in such variations and modifications thereof as will be obvious to those skilled in the art to which my invention relates, it being understood that changes may be made within the scope of what is claimed without departing from the spirit thereof.

The preferred embodiment of my invention is disclosed in the accompanying drawing, wherein:

Figure 1 is a plan view of the transit with the lid and sight arm turned back or opened;

Figure 2 is a sectional view taken on the line 2—2 of Figure 1;

Figure 3 is a bottom plan view of the casing; and

Figure 4 is a detail view taken on the line 4—4 of Figure 1.

Referring specifically to the several views, wherein similar reference numerals designate corresponding parts throughout, my improved pocket transit comprises the usual type of housing or casing 10, to which is hingedly secured the mirror-containing lid 11. A folding sight 12 is carried by the lid and, in conjunction with the sight line 13 extending across the mirror and the sight opening 14 extending through the lid, provides for the taking of readings or measurements, as will more clearly hereinafter appear. A folding sight arm 15, carrying a sight 16, is hingedly secured to the opposite portion of the housing and is used in conjunction with the sight opening 14 and sight 12 in the usual manner. Rigidly supported by the bottom wall 17 is the pintle 18 and upon which is mounted the magnetic needle 19. A suitably graduated compass ring 20 is carried by the side walls of the casing and is adapted to indicate the relative position of the transit with respect to the magnetic poles in the customary manner.

Pivotally secured to the bottom wall of the casing is the clinometer arm 21, which may be operated by the thumb lever 22 located upon the back of the bottom wall of the casing, as illustrated in Figure 3. The clinometer arm preferably carries a vernier scale 23 which moves across a graduated dial or scale 24 carried by the bottom wall 17. The clinometer arm is provided with a transverse bubble tube or spirit level 25, the plane of curvature of which is accurately located so as to be parallel with the plane of movement of the clinometer arm. A bracket arm 26 is secured to the clinometer arm and in addition to supporting the spirit level or transverse bubble tube 25, projects outwardly as at 27 and receives the universal or spherical leveling vial 28, This leveling vial comprises the dome-shaped transparent top 29 having the centralized ring or reference mark 30. The instrument may accordingly be accurately and precisely levelled by centralizing the bubble or blister with respect to the reference circle or mark.

I am aware that in the past it has been proposed to provide the clinometer arm with two bubble tubes arranged at right angles and thus provide for the transverse and longitudinal leveling of the instrument. The transverse bubble tube, however, was then called upon to act as the spirit level for the clinometer arm when the latter was being moved in a vertical plane and in order that the single tube might thus perform a double function it was proposed to arrange the curvature of the transverse tube in a plane intermediate the plane of movement of the clinometer arm and a plane at right angles thereto. Such arrangement, however, led to inaccurate results. My improved transit overcomes these objections and allows the curvature of the bubble tube to be located in the precise plane of movement of the clinometer arm and the spherical bubble tube or vial to accurately level the instrument when the magnetic readings are being taken.

Having thus described and explained my invention, what I claim as new and desire to secure by Letters Patent, is:—

A transit of the character described comprising a casing, a magnetic needle carried thereby, a graduated compass ring associated therewith, a clinometer arm pivotally secured to the bottom wall of said casing, a leveling tube mounted upon said clinometer arm and curved in a plane parallel to the plane of motion of the clinometer arm, and a leveling vial mounted upon said clinometer arm, and having a dome-shaped cover provided with a centralized reference mark thereon, said dome-shaped cover being so positioned that when the bubble registers with the reference mark thereof the plane of motion of the clinometer arm will be horizontally level whereby the clinometer arm and the transit may be levelled independently of the said leveling tube of the clinometer arm.

Signed at Hoboken, in the county of Hudson and State of New Jersey, this 5th day of April A. D. 1923.

CARL M. BERNEGAU.